Aug. 6, 1946.  A. H. INGLIS  2,405,210
SUBMARINE SIGNAL DEVICE
Filed July 3, 1942
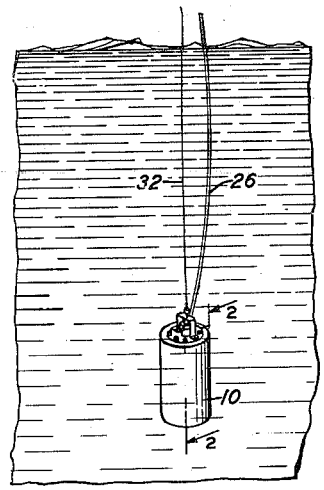
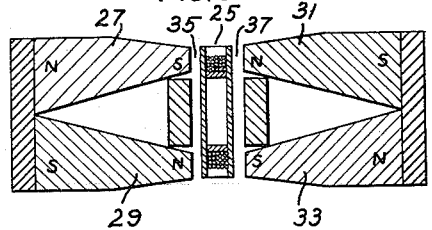
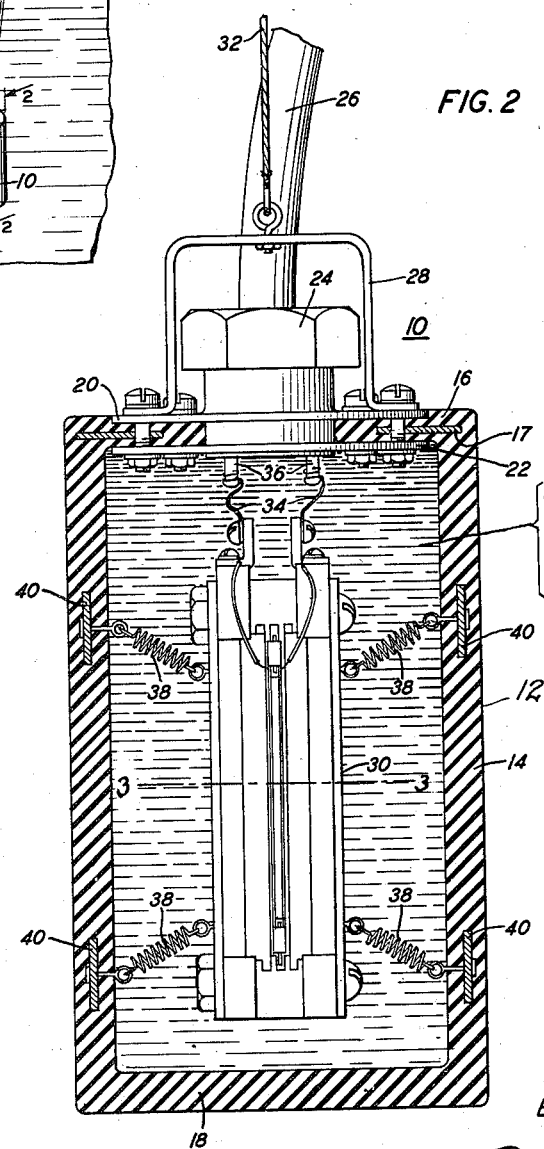
LIQUID THAT IS FREE OF
GAS BUBBLES; OF SAME
TRANSMISSION CHARACTER-
ISTIC AS WATER; AND MAY
COMPRISE AN ANTI-FREEZE
SOLUTION.
INVENTOR
A. H. INGLIS
BY
Robert J. Pluskey
ATTORNEY Patented Aug. 6, 1946

2,405,210

UNITED STATES PATENT OFFICE 2,405,210

SUBMARINE SIGNAL DEVICE

Alfred H. Inglis, Upper Montclair, N. J., assignor to Bell Telephone Laboratories, Incorporated, New York, N. Y., a corporation of New York Application July 3, 1942, Serial No. 449,584

3 Claims. (Cl. 177—386)

This invention relates to submarine signal devices, and more particularly to submarine signal detectors or microphones.

Objects of the invention are to improve the construction and the operating characteristics of submarine detectors, particularly those having moving parts with small clearances in which air bubbles may form, such as the pressure gradient type.

A pressure gradient submarine signal detector, microphone or unit may be of a construction such as is disclosed and claimed in the pending application of W. R. Harry and F. F. Romanow, Serial No. 415,032, filed October 15, 1941, for Electromechanical device. It has been observed that when such a device is submerged in a fluid medium, for example in a river, lake or ocean, and employed for detecting sonic or supersonic wave disturbances being propagated in the medium, its operating characteristics may be deleteriously affected by the presence of air or other gas bubbles in the medium. These bubbles tend to collect on the magnet structure and on the coil and to constitute elastances or mechanical stiffnesses that alter the frequency response characteristic of the device. The fluid medium, furthermore, may have a corrosive effect on parts of the detector, particularly the leads connecting the moving coil with the terminals, for example, at the junction of the leads with the terminals and with the coil. In addition, when directly exposed to the fluid medium, organic or inorganic particles or objects in the latter may collect in the air gap of the device and impede the proper movement of the moving coil or damage or otherwise interfere with the device.

In accordance with the invention, the pressure gradient submarine signal unit is enclosed in a container or envelope preferably of a material having substantially the same transmission characteristic as that of the fluid medium and resiliently suspended or supported within the container in spaced relation to the wall or walls of the latter, the container being filled with a substantially non-conducting, non-corrosive liquid medium that has been degassified. This bubble-free liquid has substantially the same transmission characteristic as that of the medium in which the device is to be submerged for detecting purposes, and may be distilled water, or gas-free dehydrated castor oil. When the submarine temperatures expected to be encountered include the freezing range, the container's liquid filling may be of an anti-freeze solution or mixture.

A more complete understanding of the invention will be derived from the detailed description that follows read with reference to the appended drawing wherein:

Fig. 1 shows a perspective view of a device embodying the invention and illustrates how it may be submerged under water at the end of a suitable supporting cable;

Fig. 2 is a cross-sectional view of the device of Fig. 1; and

Fig. 3 is a cross-sectional view of the pressure gradient unit taken on the line 3—3 of Fig. 2.

With reference now to the drawing, the submarine signal device or hydrophone 10 embodying the invention comprises a container or envelope 12 consisting of a substantially cylindrical hollow member whose cylindrical or lateral wall 14 and end walls 16, 18 are of substantially the same uniform thickness. The container may be molded of rubber which has the same transmission properties as water, that is, the product of its density and the velocity of wave propagation therethrough is the same as that for water. The centrally apertured wall 16, which may be reenforced by an insert 17, is closed by a pair of clamping plates 20, 22 and a stuffing box or gland 24 for a suitable electrical cable 26 that contains wires or conductors (not shown) for connecting the pressure gradient unit 30 with suitable electrical translating equipment (not shown) that may be located either on shore or in a boat from which the device 10 may be suspended. This closure at the wall 16 is watertight and gas-tight so as to exclude water and air or other gas from the interior of the container and to inhibit egress of the fluid in the container. A bail 28 on which the supporting or suspension cable 32 is terminated, may be fastened to the outer plate 20.

The pressure gradient unit 30 may be substantially that disclosed and claimed in the aforesaid Harry-Romanow application. It comprises an elongated coil 25 suspended to permit translational displacement in an air-gap formed between pairs of bar magnets 27, 29 and 31, 33 so positioned opposite each other as to provide magnetic flux through the two elongated sides of the coil in opposite direction. In the interest of efficiency and high sensitivity of response the clearances at 35 and 37 should be small. Electrical communication or connection between the unit 30 and the conductors in cable 26 is effected by the leads 34 and the terminal projections 36 from the gland 24. The unit is resiliently suspended or supported substantially centrally of the container by a plurality of resilient members or springs 38 two of which may be provided at the upper end and two at the lower end of the unit. The outer eyelets for the springs may be anchored to suitable inserts 40 molded into the wall 14. Instead of the springs illustrated, rubber strips or bands may be employed as the resilient supporting members.

The space or chamber defined by the container is completely filled with a liquid that completely surrounds the unit 30 and that is substantially free of air or other gas and of dirt or other particles. The liquid may be distilled water that has been degassified or debubbled, or it may be dehydrated gas-free castor oil. If the device 10 is to be used in water at a temperature below 0° C. and the liquid contents of the device is water, suitable anti-freeze mixture or solution, may be added to the container's liquid contents to insure that the latter does not freeze.

Sonic or supersonic underwater disturbances in the vicinity of the submerged detector will be transmitted by and through the container and the liquid contents thereof to the unit 30 which will respond to such transmitted vibrations or disturbances in the manner described in detail in the aforesaid Harry-Romanow application. The currents generated in the moving coil of the unit as a result of its movement in response to the pressure gradient so established between opposite surfaces of the unit, are transmitted to appropriate electrical translating equipment (not shown) through the conductors of the cable 26.

Although this invention has been disclosed with reference to a single embodiment thereof, it will be understood that it is not limited thereto but that it is capable of other exemplifications within the scope of the invention as defined in the appended claims.

What is claimed is:

1. A submarine signal detector comprising a substantially fluid-tight container transparent to submarine signal waves, a signal wave translating unit within said container, said unit being of the type including a moving coil disposed in a narrow magnetic gap in which gas bubbles tend to collect and interfere with the response of the unit when the latter is submerged, means to support said unit in spaced relation to said container, and a particle-free, gas bubble-free liquid filling the container and completely surrounding said unit and being in contact with said moving coil.

2. A submarine signal device comprising a substantially fluid-tight rubber container, a signal wave translating unit within said container, said unit having relatively moving parts with small mechanical clearance therebetween and tending when submerged to collect a gas film in the narrow clearance space means to support said unit in spaced relation to said container, and a liquid filling the container and completely surrounding said unit, said rubber and said liquid having substantially the same density times velocity of wave propagation constant as that for water and said liquid being freed of gas which might form such film.

3. In a submarine signal device for responding to under-water compressional vibrations, said device having relatively movable parts between which one or more recesses exist in which air can become trapped when the device is submerged and can influence the response characteristics of the device, means for rendering said device immune to trapped air comprising a fluid-tight bag containing said device, said bag being completely filled, except for said device, with a liquid from which dissolved and otherwise included gas has been removed.

ALFRED H. INGLIS.